J. R. Manny,
Hydrant.

No. 99,097.   Patented Jan. 25, 1870.

WITNESSES.
Jas. H. Manny Jr.
E. A. West

INVENTORS.
Jacob R. Manny

United States Patent Office.

JACOB R. MANNY, OF CHICAGO, ILLINOIS.

Letters Patent No. 99,097, dated January 25, 1870; antedated January 12, 1870.

IMPROVEMENT IN HYDRANTS.

The Schedule referred to in these Letters Patent and making part of the same.

*To all whom it may concern:*

Be it known that I, JACOB R. MANNY, of Chicago, in the State of Illinois, have invented certain new and useful Improvements in Hydrants; and I do declare that the following is a full, clear, and exact description of the same, reference being had to the accompanying drawings, making part of this specification, in which—

Figure 1:
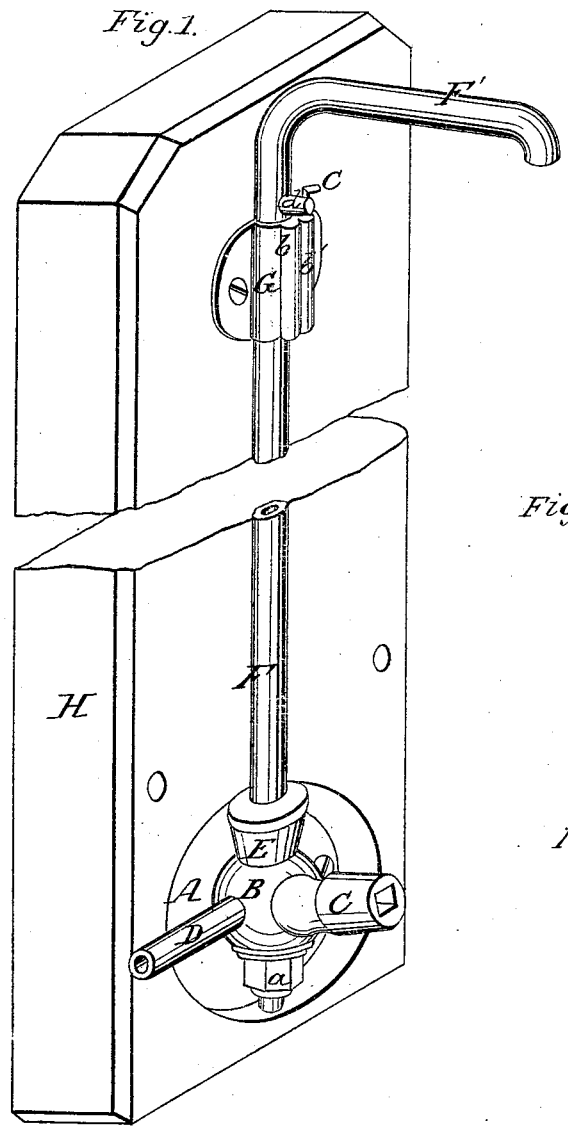
Figure 2:
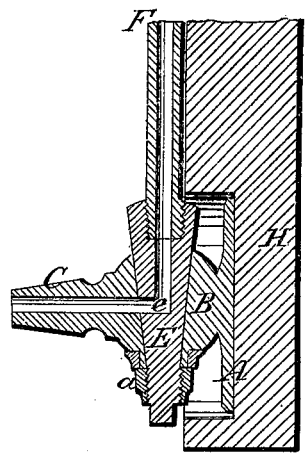
Figure 3:
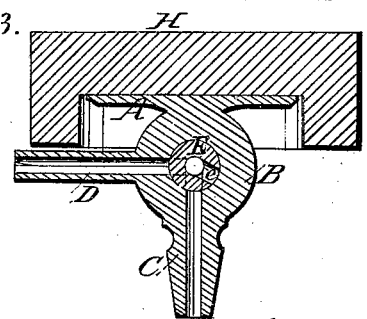
Figure 4:
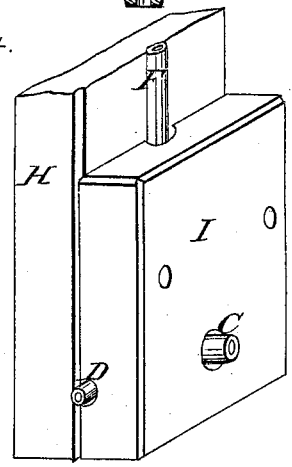

Figure 1 is a perspective.
Figure 2, a vertical section.
Figure 3, a transverse section.
Figure 4 shows the lower portion covered.

The object of my invention is to so construct a hydrant, that when the water is turned off, the same operation will both close the opening to the supply-pipe and open the waste-pipe, so that the water in the pipe above the supply-pipe will run off.

This arrangement is designed for winter-use, to prevent freezing of water in the pipe above ground. At the same time, my hydrant is so constructed that it can be readily so adjusted, that when the water is turned off, that in the pipe will remain there, and will not flow away through the waste-pipe.

The last-mentioned arrangement is suited to summer-use.

As hydrants are usually made, the water is shut off by a cock, or other device, at some point above the ground, and water remains in the pipe above ground, the opening to the supply-pipe below the ground being ordinarily open.

It being necessary to let the water out of the pipe above ground, in cold weather, to prevent freezing, a cock is placed below the ground, operated by an independent rod, by the use of which the opening into the supply-pipe can be closed, and the water in the pipe above ground be at the same time permitted to flow out through a waste-pipe; and it frequently happens, that by mistake or neglect, water is left in the pipe above ground, and the water therein freezes, bursting the pipe.

With my device, water cannot be left in the pipe above ground, through oversight or neglect.

To enable others skilled in the art to make and use my invention, I proceed to describe its construction and operation.

I place a cock below the ground, having a direct connection with the supply-pipe, and having a waste-pipe.

B represents the barrel of such cock.
C is the supply-pipe connection.
D, the waste-pipe.
E is the plug. It does not have an opening through it from side to side, as is usual, but it has an opening from one side to the centre, there connecting with the usual opening from that point to the top, as shown at *e*, fig. 2.

The plug is held in place by the nut *a*.

A is a piece of metal, attached to B, by which the cock may be secured to a standard.

The parts A B C D may be cast in one piece.

F is a tube, which I make of galvanized iron, or other strong metal. This tube is firmly secured to the plug E, and extends up as far as the water is to be carried, and is there bent, as shown.

It is secured to some suitable standard or support, by means of G, which has, attached to its front, two tubes, *b b′*, to receive a pin or stop, *c*.

G and the tubes *b b′* may be cast in one piece.

*d* is a stop on the tube F.

The plug E, tube F, and stops *d c*, are to be so arranged, relatively to each other, that when that portion of the tube F marked F′ is at right angles to the standard H, the opening *e* in the plug will be opposite to the opening into C, and the stop *d* will touch the stop *c*; and, when so placed, water will flow through the pipe F.

If, then, this pipe be turned around against the standard, it will pass over one-fourth of a circle, and the plug E turning with the pipe, the opening *e* will be brought opposite to the waste-pipe D, the angle formed by C and D being a right angle, and they being in the same plane; and thus the flow of water into F will be stopped, and the water in this pipe will flow out through the waste-pipe D.

It is thus evident that the flow of water into the pipe F, through C, is stopped, and the waste-pipe D opened by the same movement, and water cannot, by neglect, be left standing in F.

If the pin or stop *c* be removed from *b′*, and placed in *b*, the tube F can be turned around against the standard in the other direction, stopping the flow of water, but not opening the waste-pipe.

The cock can be easily enclosed, and protected from dirt by means of a wooden cap, I, fastened to the standard H, in any suitable manner.

This hydrant is less expensive than that in common use, and occupies but little space.

My device is adapted not only to street-hydrants and washers, but can be used in dwellings, the basements of which are likely to freeze; and the pipe F can be carried into the first or second story in a direct line.

The channels *b b′* might be provided with a screw-thread, and a screw could be used for the stop *c*, to guard against improper removal.

Other stops may be used in the place of *c d*; or a short chain could be attached to the end of F′, its other end being secured to the standard H, either to the right or left of the tube F, according to the manner in which the cock is to be used.

If the opening $e$ into the plug E extended through the same, from side to side, it would open into the waste-pipe D, whenever the water was turned off, whether the tube F were turned to the right or left, and water would never be left standing in such tube.

Having thus fully described my invention,

What I claim as new, and desire to secure by Letters Patent, is as follows:

The combination of the cock B, C, and D, with the pipe F, stop $d$, and adjustable stop $c$, substantially as and for the purposes specified.

JACOB R. MANNY.

Witnesses:
JAS. H. MANNY, Jr.,
E. A. WEST.